(12) United States Patent
Kind et al.

(10) Patent No.: US 6,712,175 B2
(45) Date of Patent: Mar. 30, 2004

(54) STEERING SYSTEM FOR A MOTOR VEHICLE

(75) Inventors: Thomas Kind, Stuttgart (DE); Reinhard Orthmann, Mainz (DE); Juergen Trost, Grafenberg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/846,530

(22) Filed: May 4, 2001

(65) Prior Publication Data
US 2002/0005315 A1 Jan. 17, 2002

(30) Foreign Application Priority Data
May 4, 2000 (DE) .......................... 100 21 814

(51) Int. Cl.$^7$ ................................................ B62D 5/00
(52) U.S. Cl. ............................................... 180/402
(58) Field of Search ................... 180/402, 403, 180/443, 446

(56) References Cited

U.S. PATENT DOCUMENTS

| 5,097,917 A | * | 3/1992 | Serizawa et al. | 180/402 |
| 5,803,202 A | * | 9/1998 | Bohner et al. | 180/402 |
| 5,896,942 A | * | 4/1999 | Bohner et al. | 180/402 |
| 6,000,490 A | * | 12/1999 | Easton | 180/402 |
| 6,041,882 A | * | 3/2000 | Bohner et al. | 180/402 |
| 6,059,068 A | * | 5/2000 | Kato et al. | 180/402 |
| 6,138,788 A | * | 10/2000 | Bohner et al. | 180/402 |
| 6,213,248 B1 | * | 4/2001 | Kawaguchi et al. | 180/402 |
| 6,283,243 B1 | * | 9/2001 | Bohner et al. | 180/402 |
| 6,484,838 B1 | * | 11/2002 | Borsting et al. | 180/402 |

FOREIGN PATENT DOCUMENTS

| DE | 4241849 | 6/1994 | | |
| DE | 19546733 | 3/1997 | | |
| DE | 19607028 | 8/1997 | | |
| DE | 19754258 | 6/1999 | | |
| DE | 19820774 | * 11/1999 | ............ B62D/6/00 |
| DE | 19834870 | 2/2000 | | |
| DE | 19841913 | 3/2000 | | |
| WO | 99/58390 | * 11/1999 | ............ B62D/6/00 |

* cited by examiner

Primary Examiner—Daniel G. DePumpo
(74) Attorney, Agent, or Firm—Crowell & Moring LLP

(57) ABSTRACT

A steering system for a motor vehicle, which allows steer-by-wire operation, a hand-torque actuator being connected in the steer-by-wire mode to a steering handle, e.g. a steering wheel, to simulate a steering resistance or a restoring torque. In order to be able to ensure adequate operating safety for the vehicle if the hand-torque actuator fails, even if the steering system is operated on a steer-by-wire basis, damping means are provided, which damp adjusting movements of the steering handle by the driver in the steer-by-wire mode if the hand-torque actuator fails.

12 Claims, 1 Drawing Sheet

STEERING SYSTEM FOR A MOTOR VEHICLE

BACKGROUND AND SUMMARY OF THE INVENTION

This application claims the priority of German patent document 100 218 14.8, filed May 4, 2001, The invention relates to a steering system for a motor vehicle.

A steering system of this kind is known from DE 196 07 028 C1 and is designed in such a way that it allows steer-by-wire operation, with a vehicle steering wheel being effectively connected to steerable vehicle wheels by a control system without a positive mechanical connection between the steering wheel and steerable vehicle wheels. A steering system of this kind is provided with a hand-torque actuator, which is connected to the steering wheel in steer-by-wire mode to simulate a steering resistance and/or a restoring torque. The hand-torque actuator can be used to provide haptic feedback at the steering wheel even in steer-by-wire mode—as in a conventional vehicle steering system with a continuous mechanical driving link between the steering wheel and steerable vehicle wheels—this feedback representing a restoring force and a steering resistance. A hand-torque actuator of this kind can likewise be used to simulate steering and disturbing forces actually acting at the steerable vehicle wheels.

Simulation of a steering resistance is of considerable importance for steering feel in steer-by-wire mode.

If the hand-torque actuator fails on a curve during a journey in steer-by-wire mode, the steering resistance simulated by the hand-torque actuator suddenly disappears. Since this steering resistance artificially produced by the hand-torque actuator is in equilibrium with the hand force introduced into the steering wheel by the driver, at least during a constant cornering movement, failure of the hand-torque actuator leads to a sudden disappearance of the steering resistance, with the result that only the hand force of the driver is acting. This can lead to an uncontrolled steering movement.

In order to avoid uncontrolled steering movement in the event of the hand-torque actuator failing, the actuator can have a redundant construction, i.e. the significant components of the hand-torque actuator are duplicated. Apart from the associated complexity and costs, there is also no room to install a redundant hand-torque actuator in certain types of vehicles.

The present invention is concerned with the problem of specifying an embodiment of a steering system of the above discuss type stated at the outset which can ensure adequate vehicle safety even if the hand-torque actuator fails in steer-by-wire mode. Additionally, the steering system should be relatively inexpensive and should require only a relatively small amount of installation space.

The invention is based on the general idea of damping adjusting movements of the steering handle initiated by the driver, at least if the hand-torque actuator fails.

The provision of damping means eliminates the need to fit a redundant hand-torque actuator, thereby making it possible to save on costs, on the effort involved in assembly and on installation space. The invention exploits the realization that it is sufficient to guarantee vehicle safety in the event of the hand-torque actuator failing if the adjusting movements of the steering handle by the driver are dampened in steer-by-wire operation.

It is clear that "failure" of the hand-torque actuator is understood to mean only a malfunction of the kind where the steering handle is not locked by the hand-torque actuator.

In the present invention, the term "damping" is based on the following convention: while a spring action produces displacement-dependent counterforces and countertorques, damping produces speed-dependent counterforces and countertorques. In the present case, this means that relatively rapid adjusting movements of the steering handle by the driver are counteracted by relatively large damping torques while, correspondingly, relatively slow adjusting movements by the driver are counteracted by relatively small damping torques. Since the speed of the adjusting movements by the driver is correlated with the magnitude of the hand torque introduced into the steering handle by the driver, the damping torque counteracting the adjusting movement by the driver depends on the magnitude of the hand torque introduced by the driver.

According to a preferred embodiment of the present invention, the hand-torque actuator can include an electric motor, which is connected to the steering handle in such a way that adjusting movements of the steering handle are associated with relative rotation between a rotor and a stator of the electric motor. The damping means can then have a circuit arrangement that switches windings of the electric motor in such a way that voltages induced by relative rotation between the rotor and the stator produce damping torques that counteract the relative rotation. Here, the effect of the circuit arrangement is that the electric motor operates as a generator if the hand-torque actuator fails. By virtue of this measure, the damping function, in effect, integrated into the hand-torque actuator or electric motor. Such a circuit arrangement requires only a small amount of installation space and is generally inexpensive. Moreover, the circuit arrangement can be mounted directly on the hand-torque actuator or electric motor and can therefore be installed in the electric motor at the manufacturers. It is thus possible to provide a hand-torque actuator with an integral damping function which can be activated for emergency operation of the hand-torque actuator in the event of relevant malfunctions. The integral construction furthermore simplifies assembly without giving rise to high additional costs for emergency operation, requirements of the hand-torque actuator.

In a development of the invention, it is also possible for the circuit arrangement to be designed in such a way that the damping depends on additional parameters, e.g. vehicle speed. At higher vehicle speeds, for example, the damping should be greater than at low vehicle speeds. In particular, the damping can also have a value of zero while the vehicle is being manoeuvred.

According to another embodiment, the damping means can have at least one mechanically operating damper member, which is coupled to the steering handle. A damper member of this kind can, for example, be coupled permanently to the steering handle with its damping action being compensated for in normal operation of the hand-torque actuator by appropriate control of the hand-torque actuator. Another possibility is a damper member that can be connected when required and is therefore coupled to the steering handle only if the hand-torque actuator fails. A damper member of this kind can produce the required damping by mechanical friction, for example. As an alternative, a damper member of this kind can also be designed in such a way that the adjusting movements of the steering handle by the driver drive or displace a fluid in the damper member, the damper member producing the desired damping by restricting the flow of this fluid.

In a preferred development of the steering system according to the invention, a spring device preload the steering handle into a central position. This spring device can be used to apply a restoring torque to the steering handle.

It is self-evident that the features mentioned above and those that will be mentioned below can be employed not only in the respectively indicated combination but also in different combinations or in isolation without departing from the scope of the present invention.

Other objects, advantages and novel features of the present invention will become apparent from the following detailed description of the invention when considered in conjunction with the accompanying drawings.

BRIEF DESCRIPTION OF THE DRAWINGS

A preferred exemplary embodiment of the invention is illustrated in the drawing and is explained in greater detail in the following description.

The single

DETAILED DESCRIPTION OF THE PREFERRED EMBODIMENT

Figure 1:
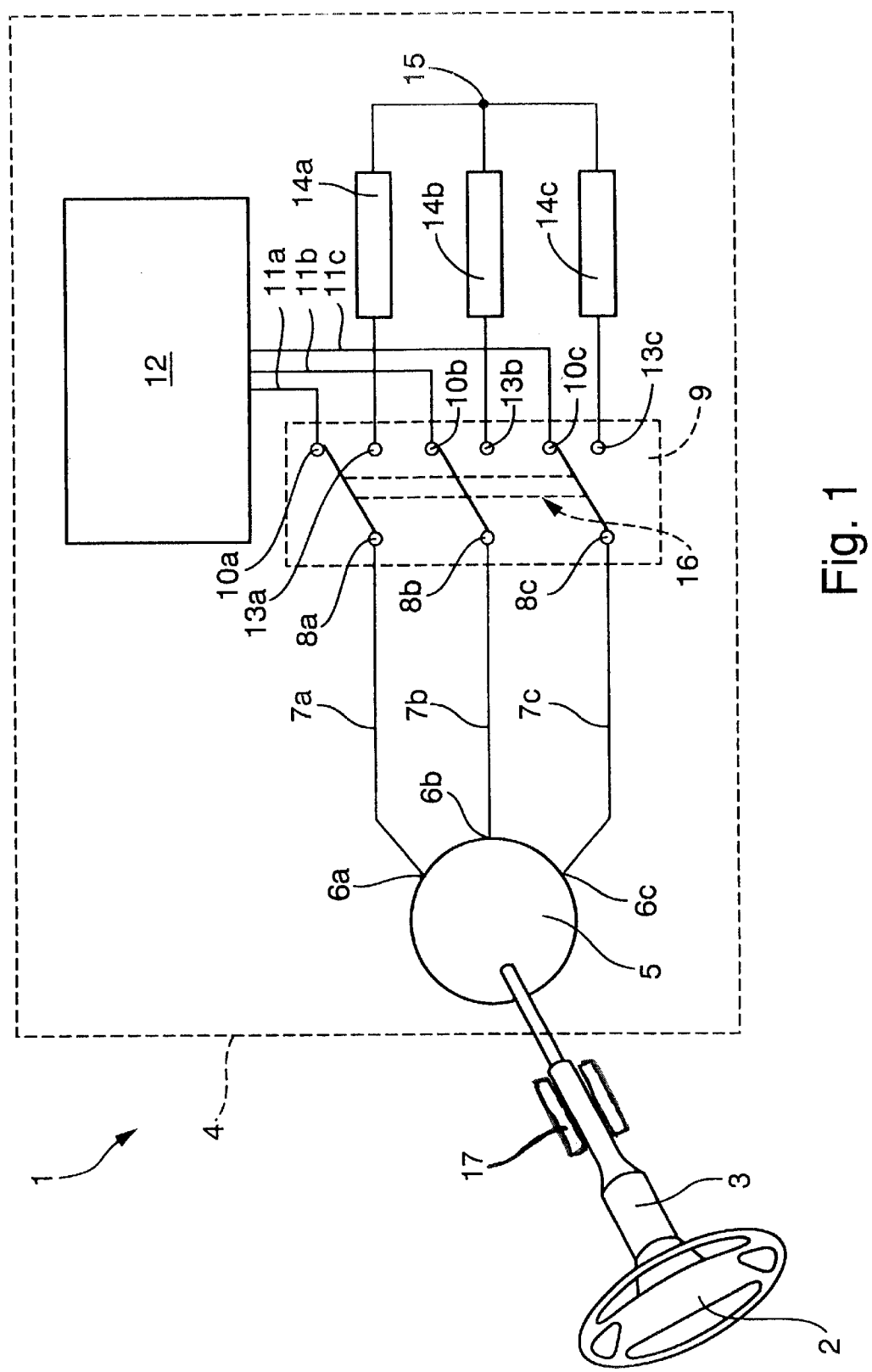
FIG. 1 shows a schematic basic representation of a steering system according to the invention.

Steering systems for motor vehicles that allow steer-by-wire operation are well known from the prior art and therefore do not need to be described in greater detail. The following description of the figure therefore relates primarily to those components of a steering system according to the invention in a specific embodiment which are relevant to the invention.

According to FIG. 1, a steering system 1 has a steering handle 2, which is here designed as a steering wheel. The steering handle 2 is used by the driver of the vehicle to input his steering requirements in the form of a rotary actuation of the steering handle 2. In terms of drive, the steering handle 2 is connected by a steering shaft 3 to a hand-torque actuator 4, which is here indicated purely symbolically by a frame illustrated by broken lines.

In the preferred embodiment, the hand-torque actuator 4 has an electric motor 5, which has a rotor and a stator. The rotor is connected to the steering shaft 3, for example, while the stator is firmly connected to the vehicle's body. Another possible embodiment has the stator coupled to the steering shaft 3 while the rotor is fixed to the vehicle. In addition, the hand-torque actuator 4 has a hand-torque control unit that actuates the electric motor 5 as a function of parameters. For the sake of clarity, however, this control unit is not shown here.

The electric motor 5 can be designed as a brushless or brush-type motor, for example, which can be either permanently excited or externally excited. The embodiment illustrated here is, for example, a three-phase brushless d.c. motor, which accordingly has three motor windings. The electric motor 5 therefore has three electrical connections 6a, 6b, 6c, which are each connected within the electric motor 5 to one of the windings of the electric motor 5. The connections 6a, 6b, 6c are connected by corresponding connecting lines 7a, 7b, 7c to inputs 8a, 8b, 8c of a three-pole changeover switch 9. This changeover switch 9 has first outputs 10a, 10b, 10c, which are connected by connection lines 11a, 11b, 11c to a power supply 12, e.g. power electronics, of the electric motor 5. Second outputs 13a, 13b, 13c of the changeover element 9 are each connected via electrical resistors 14a, 14b, 14c to a star point 15 and thereby form a star circuit.

The changeover element 9 contains switching means 16 that can be actuated synchronously and, in a first position illustrated in FIG. 1, connect the inputs 8a, 8b, 8c to the first outputs 10a, 10b, 10c. In a second position, the switching means 16 connect the inputs 8a, 8b, 8c to the second outputs 13a, 13b, 13c.

During steer-by-wire operation of the steering system 1, the switching means 16 of the changeover switch 9 occupy their first position when the hand-torque actuator 4 is operating correctly. If the hand-torque actuator 4 fails, the switching means 16 of the changeover switch 9 are switched to their second position. The steering system 1 according to the invention operates as follows:

In the steer-by-wire mode of the steering system 1, correct operation of the hand-torque actuator 4 is continuously monitored. As long as a corresponding control system (not shown here) for the steering system or the hand-torque actuator 4 detects that the hand-torque actuator 4 is operating correctly, the switching means 16 of the changeover switch 9 are switched to their first position. The connections 6a, 6b, 6c of the electric motor 5 are accordingly connected to the power supply 12 by means of which the actuation of the electric motor 5 is performed in order to simulate steering resistance and/or restoring torques and/or disturbing forces at the steering handle 2.

As soon as a sufficiently serious malfunction is detected in the hand-torque actuator 4 as part of the process of monitoring its operation, this is interpreted as failure of the hand-torque actuator 4, causing the switching means 16 of the changeover switch 9 to switch to their second position. A corresponding control unit that actuates the changeover switch 9 in a corresponding manner is not shown here. The changeover switch 9 can have a solenoid, for example, which, when energized, switches the switching means 16 to a first position. In this arrangement, spring means can be provided to switch the switching means 16 into a second position when the solenoid is deenergized.

If the hand-torque actuator 4 fails, the connections 6a, 6b, 6c of the electric motor 5 are accordingly connected to one another in a star pattern via the electrical resistors 14a, 14b, 14c. Since the electric motor 5 is then separated from the power supply 12, it can operate as a generator. When the driver then introduces a hand torque into the steering handle 2, this results in an adjusting movement of the steering handle 2 and thus a rotation of the steering shaft 3. By virtue of the coupling of the electric motor 5 to the steering shaft 3, an adjusting movement of the steering handle by the driver is then inevitably associated with a relative adjustment between the rotor and the stator of the electric motor 5. Such a relative adjustment between the rotor and the stator induces an electrical voltage in the windings of the electric motor 5. Since the connections 6a, 6b, 6c are connected to one another via the resistors 14a, 14b, 14c, electric currents can form, with the result that damping torques are produced in the electric motor 5, counteracting a relative adjustment between the rotor and the stator. These damping torques accordingly also act on the steering handle 2 via the steering shaft 3. The extent of these damping torques can be set to a desired value by appropriate choice of the resistors 14a, 14b, 14c.

It is also possible to use variable or adjustable resistors instead of constant resistors 14a, 14b, 14c. It is furthermore possible to combine the resistors 14a, 14b, 14c with other electrical components to form an electrical network. Such a network can have active and/or passive, linear and/or non-linear components, thereby allowing the damping of the steering handle 2 to be given a corresponding linear or non-linear, e.g. progressive, configuration. This furthermore makes it possible to take into account additional parameters for the configuration of a desired damping characteristic. The damping effect can, for example, be varied as a function of the vehicle speed and/or as a function of the steering angle.

The damping means described above, namely changeover switch 9 and star circuit 14, 15, can be integrated in a particularly simple manner into the hand-torque actuator 4, giving a hand-torque actuator 4 of compact construction with an integral emergency operating function. In addition or as an alternative, the damping means can also have a mechanically operating damper member 17 coupled to the steering handle 2. In FIG. 1, the damper member 17 is arranged in such a way that it acts on the steering shaft 3, the damper member 17 being illustrated only symbolically and in broken lines. The damper member 17 can, for example, give rise to mechanical friction on the steering shaft 3, thereby enabling a certain damping effect to be achieved. Such a damper member 17 can also be designed in such a way that a steering actuation of the steering handle 2 drives a fluid in the damper member 17 and, for example, displaces it from a first chamber to a second chamber. A restrictor is arranged in the flow path of the fluid, thereby producing the desired damping effect on the adjusting motion of the steering handle 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Steering system for a motor vehicle, for providing steer-by-wire made of operation, said system comprising:
   a hand-torque actuator connected, in the steer-by-wire mode, to a steering handle for simulating a steering resistance or a restoring torque; and
   damping means which damp adjusting movements of the steering handle by a driver in the steer-by-wire mode only when the hand-torque actuator fails, wherein the hand-torque actuator includes an electric motor, which is connected to the steering handle whereby adjusting movements of the steering handle are associated with relative rotation between a rotor and a stator of the electric motor, in that the damping means have a circuit arrangement that switches windings of the electric motor in such a way that voltages induced by relative rotation between the rotor and the stator produce damping torques that counteract the relative rotation.

2. The steering system according to claim 1, wherein the circuit arrangement has at least one electrical resistor.

3. Steering system according to claim 1,
   wherein the circuit arrangement has at least one changeover element, which connects at least one winding of the electric motor to a power supply when the hand-torque actuator is operating correctly and separates it from the power supply when the hand-torque actuator fails and connects it to an electrical circuit of the circuit arrangement, which uses the voltages induced by relative rotation between the rotor and the stator to produce the damping torques that counteract the relative rotation.

4. The steering system according to claim 3,
   wherein the electrical circuit connects the windings of the electric motor to one another via electrical resistors to a star point to form a star circuit.

5. The steering system according to claim 2,
   wherein each of said at least one resistor is of adjustable design.

6. The steering system according to claim 1,
   wherein damping depends on parameters additional to said adjusting movements of the steering handle.

7. The steering system according to claim 1,
   wherein the circuit arrangement has an electrical network including a plurality of interconnected electrical components.

8. The steering system according to claim 7,
   wherein the components are one of an active, passive linear and non-linear configuration.

9. The steering system according claim 1,
   wherein the damping means have at least one mechanically operating damper member, which is coupled to the steering handle.

10. The steering system according to claim 9, wherein the damper member uses mechanical friction to produce the damping that counteracts the adjusting movements of the steering handle by the driver.

11. The steering system according to claim 9, wherein adjusting movement of the steering handle by the driver drives a fluid in the damper member, with the damper member restricting the flow of the fluid to produce the damping that counteracts the adjusting movements of the steering handle by the driver.

12. The steering system according to claim 1, further including spring means are provided that preload the steering handle into a central position.

* * * * *